United States Patent
Kato et al.

(10) Patent No.: US 9,831,713 B2
(45) Date of Patent: Nov. 28, 2017

(54) ANTENNA UNIT AND PORTABLE ELECTRONIC APPARATUS

(71) Applicant: Seiko Instruments Inc., Chiba-shi, Chiba (JP)

(72) Inventors: Teruo Kato, Chiba (JP); Hideki Okuda, Chiba (JP); Yasunori Hara, Chiba (JP); Takahiro Kaneko, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 163 days.

(21) Appl. No.: 15/050,025

(22) Filed: Feb. 22, 2016

(65) Prior Publication Data

US 2016/0261136 A1 Sep. 8, 2016

(30) Foreign Application Priority Data

Mar. 5, 2015 (JP) ................. 2015-043910

(51) Int. Cl.
| | |
|---|---|
| *H02J 7/00* | (2006.01) |
| *H02J 7/02* | (2016.01) |
| *H04B 5/00* | (2006.01) |
| *H04B 1/3827* | (2015.01) |
| *H02J 50/27* | (2016.01) |

(52) U.S. Cl.
CPC ............ *H02J 7/025* (2013.01); *H02J 7/0042* (2013.01); *H02J 50/27* (2016.02); *H04B 1/3827* (2013.01); *H04B 5/0025* (2013.01); *H04B 5/0037* (2013.01); *H04B 5/0093* (2013.01)

(58) Field of Classification Search
CPC ...................................................... H02J 50/27
See application file for complete search history.

(56) References Cited

U.S. PATENT DOCUMENTS

2015/0349578 A1* 12/2015 Hu, Jr. ............... H02J 7/0042
 320/108

FOREIGN PATENT DOCUMENTS

| JP | 06-188809 A | | 7/1994 |
|---|---|---|---|
| JP | 2001147281 A | * | 5/2001 |
| JP | 2013181918 A | * | 9/2013 |
| JP | 2013197786 A | * | 9/2013 |

* cited by examiner

*Primary Examiner* — Jared Fureman
*Assistant Examiner* — Joel Barnett
(74) *Attorney, Agent, or Firm* — Brinks Gilson & Lione

(57) ABSTRACT

An antenna unit includes: an external body; a display unit which is provided on one side of the external body and displays information; an antenna which is provided on the other side of the external body and is disposed to face the display unit at an interval therebetween; an internal body which accommodates the antenna and is movable with respect to the external body toward a side opposite to the display unit. The external body has a belt connecting section which protrudes toward the side opposite to the display unit. The internal body protrudes from the external body by moving toward the side opposite to the display unit. The internal body protrudes farther from the external body than the belt connecting section from the external body.

6 Claims, 9 Drawing Sheets

ANTENNA UNIT AND PORTABLE ELECTRONIC APPARATUS

RELATED APPLICATIONS

This application claims priority under 35 U.S.C. §119 to Japanese Patent Application No. 2015-043910 filed on Mar. 5, 2015, the entire content of which is hereby incorporated by reference.

BACKGROUND OF THE INVENTION

1. Field of the Invention

The invention relates to an antenna unit and a portable electronic apparatus.

2. Description of the Related Art

In various electronic apparatuses including an electronic watch, a wireless charging system using, for example, electromagnetic induction, without direct connection to a charger through a wire, is widely available.

A charger for wireless charging includes a power supply coil and a cover plate which covers the power supply coil. Meanwhile, an electronic apparatus includes a power receiving coil in a housing.

When the electronic apparatus approaches the cover plate in a state in which a current is applied to the power supply coil of the charger, electromagnetic induction occurs between the power supply coil and the power receiving coil and power (induced electromotive force) is generated on the power receiving coil side. In the electronic apparatus, charging of a built-in battery in the electronic apparatus is performed with the power generated in the power receiving coil.

Here, in order to enhance charging efficiency, it is preferable that the power supply coil and the power receiving coil approach each other as close as possible. Accordingly, the electronic apparatus, for example, may have a flat surface as a surface on a side on which the power receiving coil is provided, the electronic apparatus may be mounted on the cover plate of the charger, and the electronic apparatus may come into direct contact with the cover plate.

Incidentally, in various electronic apparatuses, various uneven shapes are often formed on the side on which the power receiving coil is provided. For example, in the case of the wristwatch-type electronic watch, the power receiving coil is accommodated in a main body case together with a movement which drives the watch. In the main body case, a belt connecting section, to which a belt for wearing the wristwatch-type electronic watch on a wrist is connected, is provided. In general, the belt connecting section is provided to obliquely protrude from the main body case. Thus, since a case back surface of the main body case and the belt connecting section have a shape of the surface of the wrist, a sense of stability or wearing sensation is enhanced when the wristwatch-type electronic watch is worn on the wrist.

Incidentally, when the belt connecting section obliquely protrudes, the belt connecting section comes into contact with the cover plate when the wristwatch-type electronic watch is mounted on the cover plate of the charger. Therefore, a gap is formed between the case back surface of the wristwatch-type electronic watch and the cover plate of the charger, a distance between the power supply coil and the power receiving coil is increased, and thus charging efficiency is lowered.

For example, JP-A-6-188809 discloses a configuration in which a lid member including a built-in coil (antenna) is provided on a surface side of the main body case of a wristwatch and the lid member is linked to the main body case through a hinge so as to be openable and closable.

In the configuration, the lid member is closed and opened, and thereby it is possible to adjust a position of the coil with respect to the main body case. The coil in JP-A-6-188809 is used in a communication system; however, the coil is replaced with the power receiving coil for charging. Hence, during the charging, it is considered that the position of the power receiving coil is adjusted in the state in which the lid member is opened, the power supply coil and the power receiving coil approach, and thus it is possible to enhance the charging efficiency.

However, in the configuration as disclosed in JP-A-6-188809, in order to cause the power receiving coil provided in the lid member to approach the power supply coil of the charger, during the charging, the wristwatch needs to be turned over in a state in which the lid member is opened and needs to be mounted on the cover plate of the charger.

However, when the wristwatch-type electronic watch in the state of being turned over is mounted on the cover plate of the charger, it is not possible to visually recognize a display unit in a case of checking the time during the charging. Such a problem is not limited to the wristwatch-type electronic watch, but arises similarly as long as the electronic apparatus includes a display unit.

SUMMARY OF THE INVENTION

The present invention is provided in consideration of the circumstances described above and an object thereof is to provide an antenna unit and a portable electronic apparatus in which it is possible to secure high charging efficiency without impairing visibility of the display unit.

According to an aspect of the present invention, there is provided an antenna unit including: a case main body; a display unit which is provided on one side of the case main body and displays information; an antenna which is provided on the other side of the case main body and is disposed to face the display unit at an interval therebetween; and an antenna accommodating unit which accommodates the antenna and is movable with respect to the case main body toward a side opposite to the display unit.

According to the present invention, during normal use, the antenna accommodating unit is disposed at a position close to the display unit, and thus during charging, it is possible to cause the antenna accommodating unit to move toward the side opposite to the display unit. Thus, it is possible to cause the antenna to approach a coil of a charger or the like without causing the display unit to face the charger. Accordingly, it is possible to realize an antenna unit in which it is possible to secure high charging efficiency without impairing visibility of the display unit.

In the aspect, the case main body may have a protruding section which protrudes toward the side opposite to the display unit. The antenna accommodating unit may protrude from the case main body by moving toward the side opposite to the display unit. The antenna accommodating unit may protrude farther from the case main body in size than the protruding section from the case main body.

According to the present invention, the antenna accommodating unit protrudes farther than the protruding section, and thereby it is possible to cause the antenna accommodating unit to come into direct contact with the charger. Accordingly, it is possible to realize an antenna unit in which it is possible to secure high charging efficiency.

In the aspect, the antenna unit may further include: a bias member that biases the antenna accommodating unit toward the side opposite to the display unit; and a holding member that holds the antenna accommodating unit in a state in which the antenna accommodating unit is positioned on the display unit side.

According to the present invention, during normal use, the antenna accommodating unit is covered with the holding member when the antenna accommodating unit is positioned on the display unit side, and thereby it is possible to improve the external appearance. In addition, during the charging, since the bias member causes the antenna accommodating unit to leap out toward the side opposite to the display unit when the holding member is released, it is possible to cause the antenna accommodating unit to easily move.

In the aspect, the holding member may be a lid member that covers the antenna accommodating unit.

According to the present invention, during normal use, the antenna accommodating unit is covered with the holding member when the antenna accommodating unit is positioned on the display unit side, and thereby it is possible to improve the external appearance. In addition, during the charging, since the bias member causes the antenna accommodating unit to leap out toward the side opposite to the display unit when the lid member is opened, it is possible to cause the antenna accommodating unit to easily move.

In the aspect, the antenna unit may further include: a locking mechanism that arbitrarily adjusts relative positions of the antenna accommodating unit and the case main body in the state in which the antenna accommodating unit is positioned on the display unit side.

According to the present invention, during normal use, by the locking mechanism, it is possible to arbitrarily adjust the relative positions of the antenna accommodating unit and the case main body in the state in which the antenna accommodating unit is disposed at a position close to the display unit. Accordingly, it is possible to prevent the antenna accommodating unit from moving inadvertently.

In the aspect, the locking mechanism may be configured to have an external threaded section formed on one side of the antenna accommodating unit and the case main body, and an internal threaded section formed on the other side of the antenna accommodating unit and the case main body.

According to the present invention, the antenna accommodating unit is caused to rotate with respect to the case main body, and thereby it is possible to cause the antenna accommodating unit to easily move. In addition, the internal threaded section and the external threaded section are tightly fastened and screwed, and thereby the locking mechanism, which arbitrarily adjusts relative positions of the antenna accommodating unit and the case main body, can be simply configured.

According to another aspect of the present invention, there is provided a portable electronic apparatus including: any one of the antenna units described above.

According to the present invention, during the charging of the portable electronic apparatus, it is possible to cause the antenna accommodated in the antenna accommodating unit to approach the charger. Accordingly, it is possible to realize a portable electronic apparatus in which it is possible to secure high charging efficiency without impairing visibility of the display unit.

According to the present invention, during normal use, the antenna accommodating unit is disposed at a position close to the display unit, and thus during charging, it is possible to cause the antenna accommodating unit to move toward the side opposite to the display unit. Thus, it is possible to cause the antenna to approach a coil of a charger or the like without causing the display unit to face the charger. Accordingly, it is possible to realize an antenna unit in which it is possible to secure high charging efficiency without impairing visibility of the display unit.

DETAILED DESCRIPTION OF THE PREFERRED EMBODIMENTS

First Embodiment

Hereinafter, a first embodiment of the present invention will be described with reference to the drawings.

Figure 1:
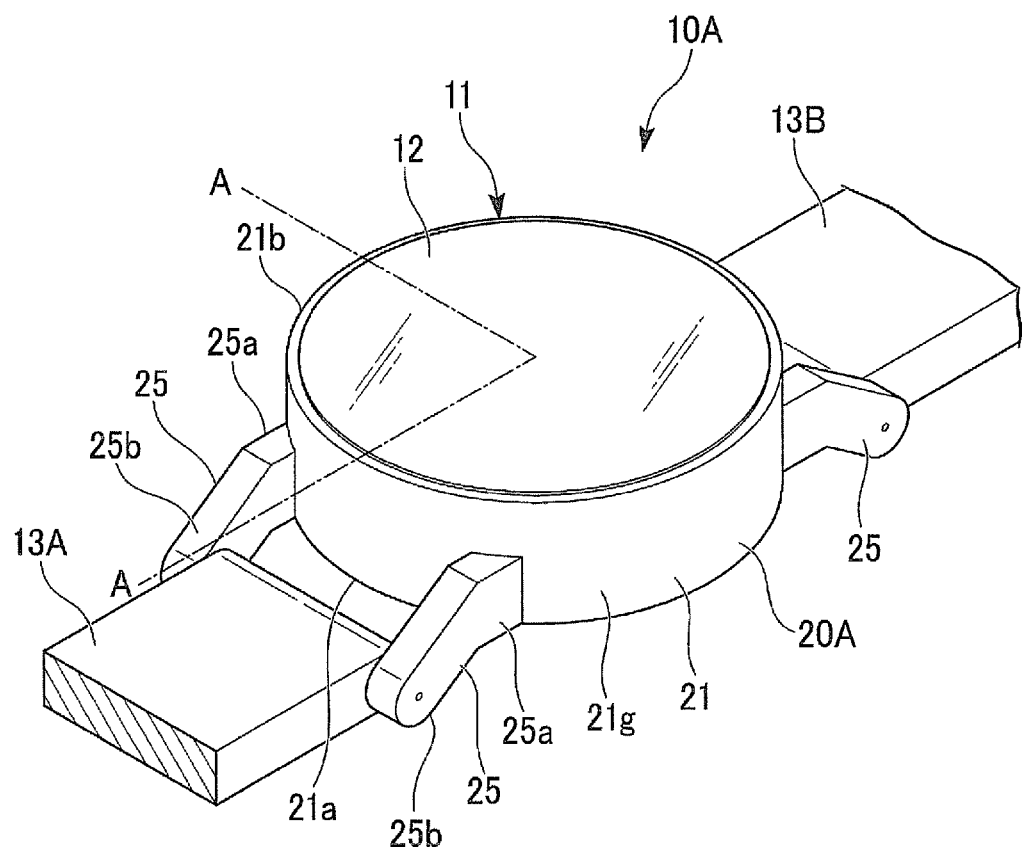
FIG. 1 is a perspective view of the external appearance of a wristwatch-type electronic watch according to a first embodiment.

FIG. 1 is a perspective view of the external appearance of a wristwatch-type electronic watch according to the first embodiment.

Figure 2:
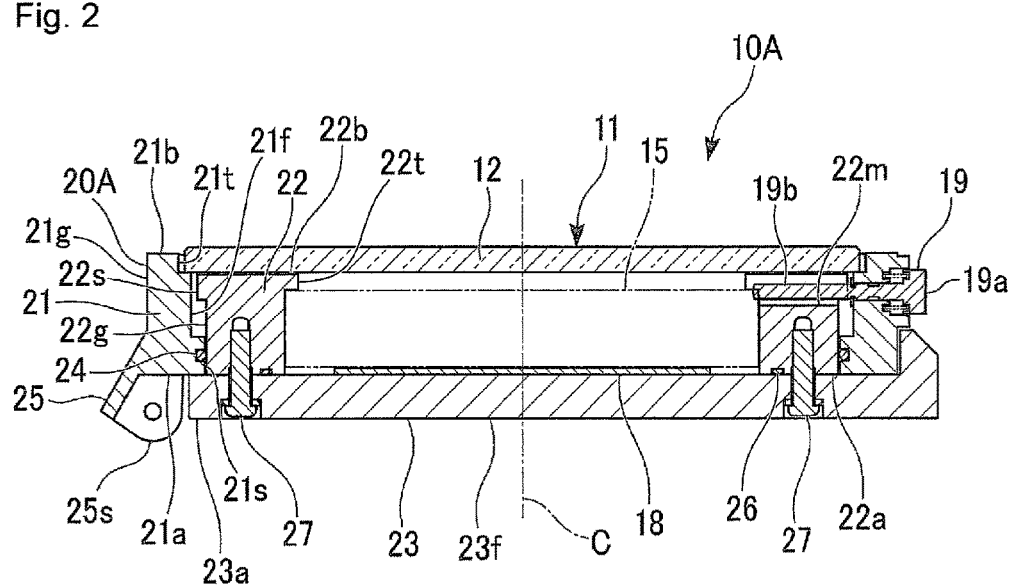
FIG. 2 is a sectional view taken along line A-A in FIG. 1 and illustrates a state in which an antenna is accommodated.

FIG. 2 is a sectional view taken along line A-A in FIG. 1 and illustrates a state in which an antenna is accommodated.

Figure 3:
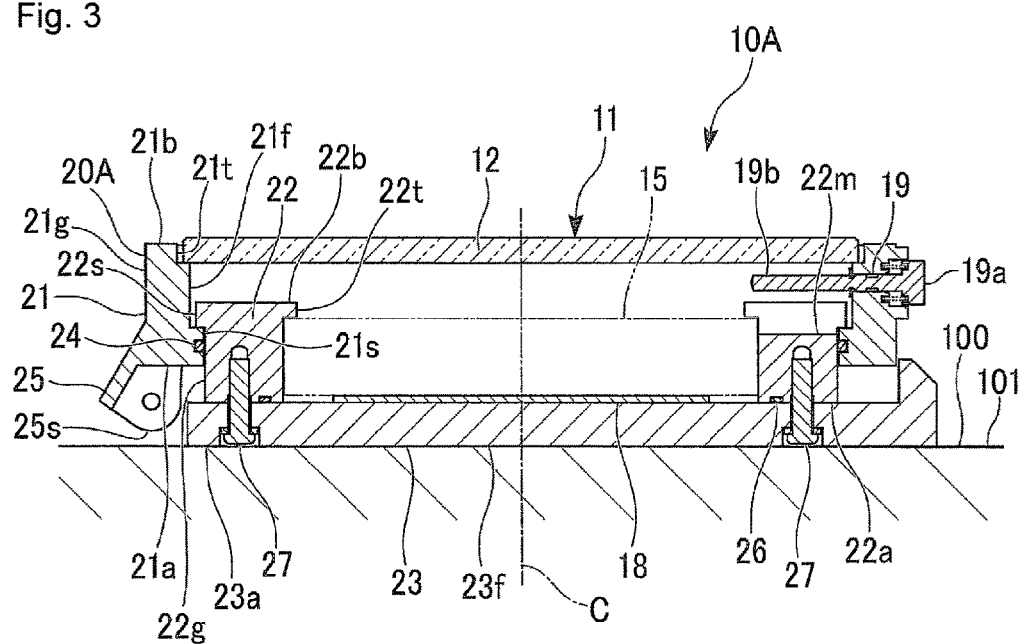
FIG. 3 is a sectional view taken along line A-A in FIG. 1 and illustrates a state in which the antenna protrudes out.

FIG. 3 is a sectional view taken along line A-A in FIG. 1 and illustrates a state in which the antenna protrudes out.

As illustrated in FIG. 1, a wristwatch-type electronic watch 10A (corresponding to a "portable electronic apparatus" in an aspect) includes a watch main body 11 (corresponding to an "antenna unit" in an aspect) and belts 13A and 13B.

As illustrated in FIG. 2, the watch main body 11 includes a case 20A, a display unit 12, a movement 15 accommodated in the case 20A, and an antenna 18.

The display unit 12 is formed of a flat liquid crystal display panel and displays information such as time.

The movement 15 has a drive unit, a battery, or the like, (not illustrated) and controls display information in the display unit 12.

The case 20A includes an external body 21 (corresponding to a "case main body" in an aspect), an internal body 22 (corresponding to an "antenna accommodating unit" in an aspect) provided in the external body 21, and a back lid 23.

The external body 21 has a cylindrical shape with both ends opened.

A protruding ridge portion 21s, which is continuous in the circumferential direction and protrudes inward, is formed in an inner circumferential surface 21f of the external body 21 on one end side 21a in a direction along a central axis C of the external body 21. An annular sealing member 24 is provided on an inner circumferential surface of the protruding ridge portion 21s.

A step portion 21t, which is increased in diameter on the outer circumferential side with respect to the inner circumferential surface 21f, is formed on the inner circumferential surface 21f of the external body 21 on the other end side 21b in the direction along the central axis C. The display unit 12 is fitted to the step portion 21t.

As illustrated in FIG. 1, two belt connecting sections 25 and 25 as a pair (corresponding to a "protruding section" in an aspect), to which belts 13A and 13B are connected, respectively, are formed in an outer circumferential surface 21g of the external body 21. The belt connecting section 25 has a base portion 25a extending from the outer circumferential surface 21g of the external body 21 toward the outer side of the external body 21, and an inclined portion 25b which is obliquely inclined from a distal end of the base portion 25a toward the one end side 21a. The belt connecting section 25 is bent along the external surface of the wrist when the watch main body 11 is worn by a user.

The belts 13A and 13B are linked to each other by a pin (not illustrated) between the inclined portions 25b and 25b of the pair of belt connecting sections 25 and 25.

As illustrated in FIG. 2, the internal body 22 has a cylindrical shape with both ends opened. The internal body 22 is provided to be slidable along an axial direction of the central axis C with respect to the external body 21. An outer circumferential surface 22g of the internal body 22 slides and comes into contact with the sealing member 24 of the external body 21. Thus, waterproof properties are secured between the internal body 22 and the external body 21.

In an end portion 22b of the internal body 22 on the display unit 12 side, an outer circumferential flange 22s which stretches out on the outer circumferential side, and an inner circumferential flange 22t which stretches out on the inner circumferential side are formed to be continuous in the circumferential direction, respectively.

The outer circumferential flange 22s butts the protruding ridge portion 21s of the external body 21 when the internal body 22 is caused to slide toward the side opposite to the display unit 12, and thereby regulating a movement amount of the internal body 22.

The movement 15 is accommodated on the inner side of the internal body 22. The inner circumferential flange 22t holds the movement 15.

An annular sealing member 26, which is continuous in the circumferential direction, is provided in an end portion 22a of the internal body 22 on the side opposite to the display unit 12.

The back lid 23 having an outer diameter greater than that of the internal body 22 is provided so as to block an opening of the internal body 22 on the end portion 22a side. The back lid 23 is fixed to the end portion 22a of the internal body 22 by using a plurality of screws 27. In addition, the outer circumferential section 23a of the back lid 23 butts the protruding ridge portion 21s of the external body 21, and thereby a sliding amount of the internal body 22 to the display unit 12 side is regulated.

The antenna 18 is provided between the back lid 23 and the movement 15 on the inner side of the internal body 22. Thus, in the watch main body 11, the antenna 18 and the display unit 12 are disposed to face each other with the movement 15 interposed therebetween. The antenna 18 is provided along the back lid 23 and, for example, a coil is wound around the central axis C.

In the watch main body 11, an operational member 19 such as a winding knob is provided. The operational member 19 is provided to penetrate the outer circumferential side and the inner circumferential side of the external body 21. A head 19a of the operational member 19 protrudes toward the outer circumferential side of the external body 21. A user can operate the head 19a from the outside of the watch main body 11.

The operational member 19 has a distal end portion 19b which reaches the movement 15 through a groove 22m formed in the end portion 22b of the internal body 22, and thereby performs a predetermined operation on a row of wheels (not illustrated) provided in the movement 15.

The wristwatch-type electronic watch 10A is charged through a charger 100. The charger 100 includes a power supply coil (not illustrated) on the back surface side of a flat cover plate 101. When the power supply coil is supplied with electricity in a state in which the wristwatch-type electronic watch 10A is mounted on the cover plate 101, the charger 100 generates power (induced electromotive force) due to electromagnetic induction between the charger and the antenna 18. The wristwatch-type electronic watch 10A accumulates the power supplied from the charger 100 to a battery (not illustrated) provided in the movement 15.

In the wristwatch-type electronic watch 10A, during normal use such as when a user wears the watch on the wrist, the internal body 22 is inserted and accommodated on the display unit 12 side with respect to the external body 21.

In addition, as illustrated in FIG. 3, during charging with the wristwatch-type electronic watch 10A mounted on the charger 100, the internal body 22 is caused to slide toward the side opposite to the display unit 12 with respect to the external body 21 and is stretched out. At this time, the outer surface 23f of the back lid 23 protrudes farther in the direction along the central axis C from a distal end portion 25s of the belt connecting section 25 in the state in which the internal body 22 is stretched out. Thus, the user can set the wristwatch-type electronic watch 10A to enter into a state in which the outer surface 23f of the back lid 23 comes into direct contact with the cover plate 101 of the charger 100.

According to the present embodiment, during the normal use, the internal body 22, in which the antenna 18 is accommodated, is disposed at a position close to the display unit 12 as illustrated in FIG. 2, and thus, during the charging, it is possible to cause the internal body 22 to move toward the side opposite to the display unit 12 as illustrated in FIG. 3. Thus, it is possible to cause the antenna 18 to approach a coil of the charger 100 without causing the display unit 12 to face the charger 100 side. Accordingly, it is possible to realize the watch main body 11 and the wristwatch-type electronic watch 10A in which it is possible to secure high charging efficiency without impairing visibility of the display unit 12.

In addition, according to the present embodiment, the internal body 22 protrudes farther from the external body 21 than the belt connecting section 25 from the external body 21. In this configuration, since it is possible to cause the internal body 22 to protrude farther than the belt connecting section 25, the user can perform the direct contact of the internal body 22 to the charger 100. Accordingly, it is possible to realize the watch main body 11 and the wristwatch-type electronic watch 10A in which it is possible to secure higher charging efficiency.

Even in a case where the external body 21 is formed of, for example, a conductive material, the antenna 18 moves toward the side opposite to the display unit 12 and protrudes out from the inner side of the external body 21, and thereby it is possible to efficiently perform the electromagnetic induction in the antenna 18. Accordingly, it is possible to realize the watch main body 11 and the wristwatch-type electronic watch 10A in which it is possible to secure high charging efficiency.

Second Embodiment

Subsequently, an antenna unit and a portable electronic apparatus according to a second embodiment will be described.

Figure 4:
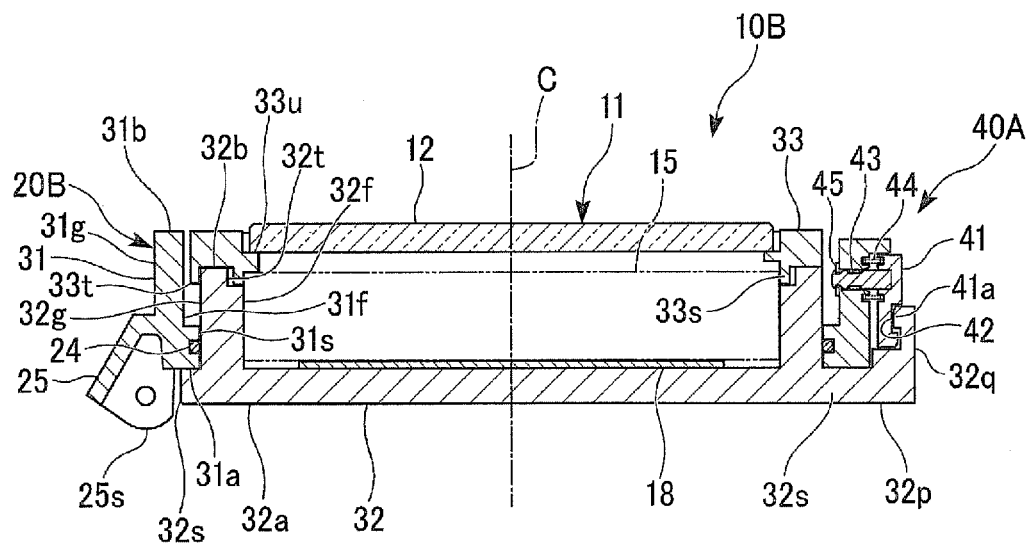
FIG. 4 is a sectional view illustrating a wristwatch-type electronic watch according to a second embodiment and illustrating a state in which an antenna is accommodated.
Figure 5:
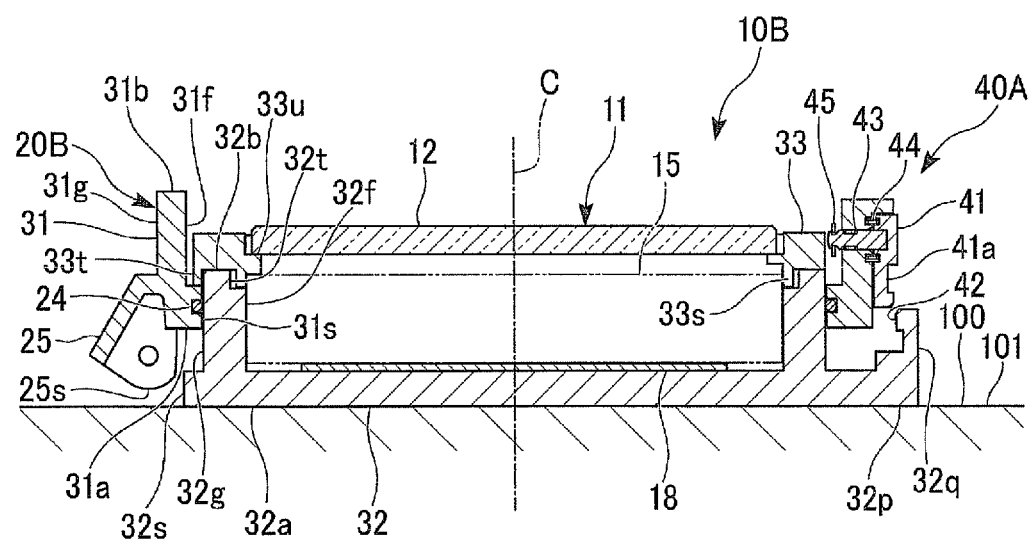
FIG. 5 is a sectional view illustrating the wristwatch-type electronic watch according to the second embodiment and illustrating a state in which the antenna protrudes out.

FIG. 4 is a sectional view illustrating the wristwatch-type electronic watch according to the second embodiment and illustrating a state in which the antenna is accommodated. FIG. 5 is a sectional view illustrating the wristwatch-type electronic watch according to the second embodiment and illustrating a state in which the antenna protrudes out.

The first embodiment has the configuration, in which the display unit 12 is provided in the external body 21 and the internal body 22 which accommodates the antenna 18 slides toward the side opposite to the display unit 12 (refer to FIG. 2). In comparison, as illustrated in FIG. 4, the second embodiment is different from the first embodiment in that the display unit 12 is provided to be integral with an internal body 32 which accommodates the antenna 18, the display unit 12 slides toward the side opposite to the display unit 12, together with the internal body 32. Further, in the second embodiment to be described below, the same reference signs are assigned to a configuration common with the first embodiment, and thus detailed description thereof is omitted.

As illustrated in FIG. 4, the watch main body 11 (corresponding to an "antenna unit" in an aspect) of a wristwatch-type electronic watch 10B (corresponding to a "portable electronic apparatus" in an aspect) includes a case 20B, the display unit 12, the movement 15 accommodated in the case 20B, and the antenna 18.

The case 20B has an external body 31 (corresponding to a "case main body" in an aspect) and the internal body 32 (corresponding to an "antenna accommodating unit" in an aspect) provided in the external body 31.

The external body 31 has a cylindrical shape with both ends opened.

A protruding ridge portion 31s, which is continuous in the circumferential direction and protrudes inward, is formed in an inner circumferential surface 31f of the external body 31 on one end side 31a in a direction along the central axis C of the external body 31. The annular sealing member 24 is provided on the inner circumferential surface of the protruding ridge portion 31s.

The internal body 32 has an end portion 32b on the other end side 31b of the external body 31, which is opened, and has a bottomed cylindrical shape having an end portion 32a on the opposite side, which is closed. The internal body 32 is provided to be slidable in the direction along the central axis C with respect to the external body 31. An outer circumferential surface 32g of the internal body 32 slides and comes into contact with the sealing member 24 of the external body 31. Thus, waterproof properties are secured between the internal body 32 and the external body 31.

A step portion 32t, which is increased in diameter on the outer circumferential side with respect to the inner circumferential surface 32f, is formed on the inner circumferential surface 32f of an end portion 32b of the internal body 32.

In an end portion 32a of the internal body 32, an outer circumferential flange 32s which stretches out on the outer circumferential side is formed. The outer circumferential flange 32s butts the protruding ridge portion 31s of the external body 31 when the internal body 32 is caused to slide toward the other end side 31b of the external body 31, thereby regulating a movement amount of the internal body 32.

An annular bezel 33 is provided in the end portion 32b of the internal body 32 on the display unit 12 side.

In the bezel 33, a protruding ridge portion 33s which protrudes to the internal body 32 side and is fitted to the step portion 32t, an outer frame portion 33t which protrudes to the internal body 32 side and is provided along the outer circumferential surface 32g of the internal body 32, and an inner circumferential flange 33u which stretches out to the inner circumferential side are integrally formed.

When the internal body 32 is caused to move toward the one end side 31a of the external body 31, the outer frame portion 33t of the bezel 33 butts the protruding ridge portion 31s of the external body 31, and thereby a movement amount of the internal body 32 is regulated.

The display unit 12 is provided on the inner side of the bezel 33. The outer circumferential portion of the display unit 12 is fixed to the inner circumferential flange 33u.

The movement 15 is accommodated on the inner side of the internal body 32. The inner circumferential flange 33u of the bezel 33 presses the outer circumferential portion of the movement 15.

The antenna 18 is provided between the end portion 32a of the internal body 32 on the closed end side and the movement 15 on the internal side of the internal body 32. Thus, in the watch main body 11, the antenna 18 and the display unit 12 are disposed to face each other with the movement 15 interposed therebetween.

In the watch main body 11, a locking mechanism 40A that regulates the sliding movement of the external body 31 and the internal body 32 and arbitrarily adjusts relative positions of the external body and the internal body. The locking mechanism 40A includes an engagement member 41 provided on the external body 31 side, and an engagement claw portion 42 which is provided on the internal body 32 side and with which the engagement member 41 engages.

The engagement member 41 has a pin 43 which penetrates through the inner circumferential side and the outer circumferential side of the external body 31 in the end portion 32b side of the internal body 32. A bias member 44, which biases the engagement member 41 outward from the external body 31, is provided coaxially with the pin 43 between the engagement member 41 and the outer circumferential surface of the external body 31. A stopper ring 45, which regulates the movement of the pin 43 outward from the external body 31, is provided at the distal end portion of the pin 43 on the inner side of the external body 31.

In the engagement member 41, a recessed engagement portion 41a is formed on a side facing the outer side. In the internal body 32, an extending portion 32p which is continuous to the outer circumferential flange 32s and extends outward from the external body 31, and a rising portion 32q which rises along the central axis C from an end portion on the outer circumferential side of the extending portion 32p, are formed in a portion in which the engagement member 41 is provided in the circumferential direction. The engagement claw portion 42, which protrudes toward the outer circumferential surface 31g of the external body 31, is formed at the distal end portion of the rising portion 32q in the end portion 32b side.

In the wristwatch-type electronic watch 10B, during the normal use such as being worn on the wrist of the user, the internal body 32 is pressed into the display unit 12 side with respect to the external body 31.

In this state, in the locking mechanism 40A, the recessed engagement portion 41a provided in the engagement member 41, and the engagement claw portion 42 provided in the internal body 32 are engaged with each other. Thus, the internal body 32 and the external body 31 are restrained not to be slidable to each other.

As illustrated in FIG. 5, when the wristwatch-type electronic watch 10B is charged from the charger 100, the engagement member 41 is pressed inward from the external body 31. Thus, since the engagement between the recessed engagement portion 41a and the engagement claw portion 42 is released, it is possible to cause the internal body 32 and the external body 31 to slide. Subsequently, the internal body 32 is caused to move with respect to the external body 31 toward the side opposite to the display unit 12. Thus, the user can set the wristwatch-type electronic watch 10B in a state in which the end portion 32a of the internal body 32 comes into direct contact with the cover plate 101 of the charger 100.

According to the second embodiment described above, similar to the first embodiment, during the charging, it is possible to cause the internal body 32 to move toward the side opposite to the display unit 12. Thus, the user can cause the antenna 18 to approach the coil of the charger 100, without causing the display unit 12 to face the charger 100 side. Accordingly, it is possible to realize the watch main body 11 and the wristwatch-type electronic watch 10B in which it is possible to secure high charging efficiency, without impairing the visibility of the display unit 12.

In addition, the wristwatch-type electronic watch includes a locking mechanism 40A which arbitrarily adjusts the relative positions of the internal body 32 and the external body 31 in the state in which the internal body 32 is positioned on the display unit 12 side. During the normal use, it is possible to restrain the external body 31 at a position at which the internal body 32 approaches the display unit 12. Accordingly, it is possible to prevent the internal body 32 from moving inadvertently.

First Modification Example of Second Embodiment

Next, respective modification examples of the second embodiment described above are described. In the second embodiment described above, a locking mechanism 40A is provided; however, the configuration is not limited to the second embodiment described above.

Figure 6:
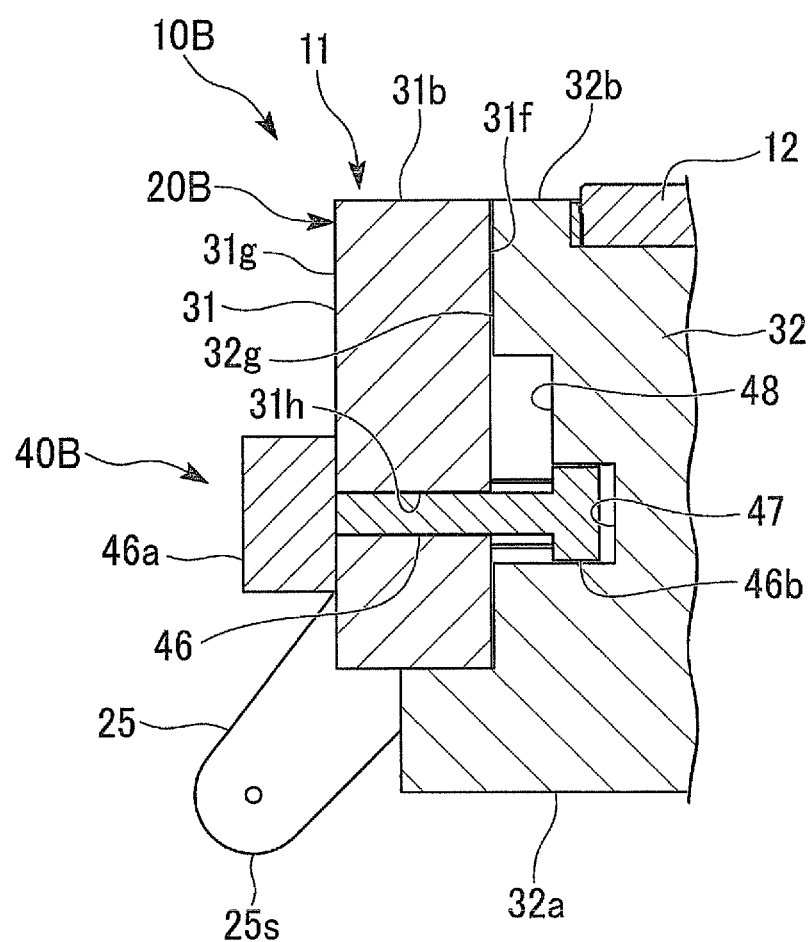
FIG. 6 is an enlarged sectional view illustrating the wristwatch-type electronic watch according to a first modification example of the second embodiment and illustrating a state in which the antenna is accommodated.
Figure 7:
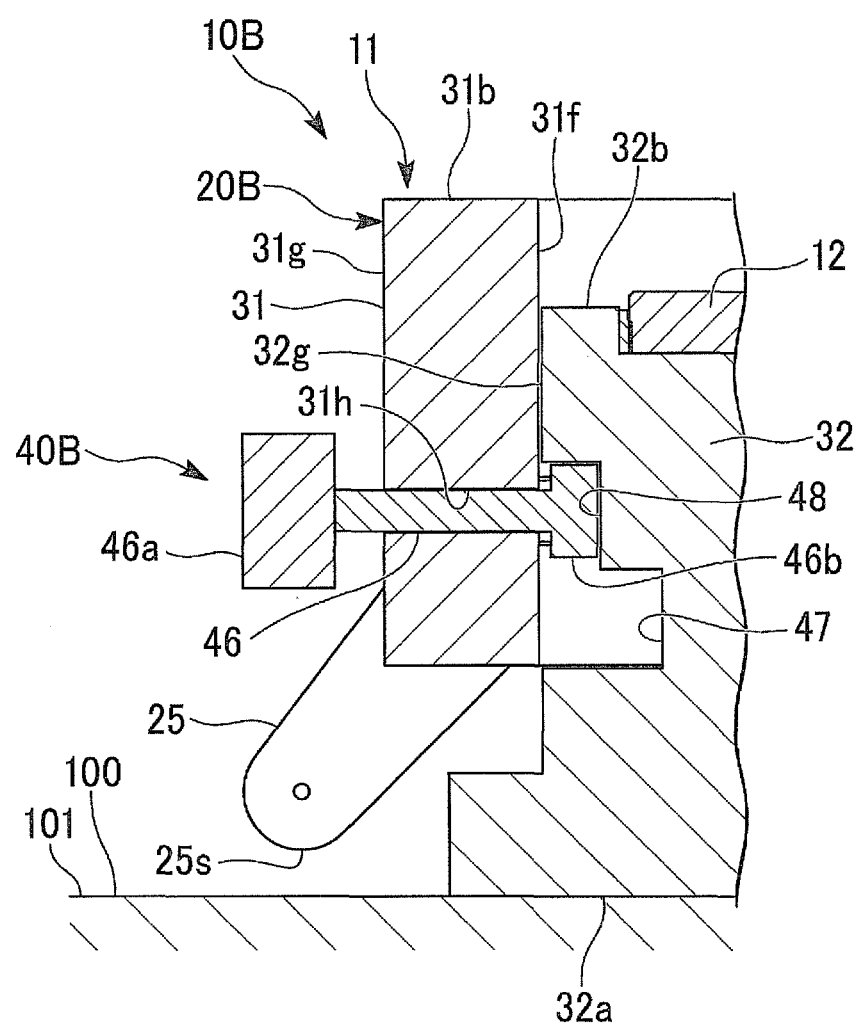
FIG. 7 is an enlarged sectional view illustrating the wristwatch-type electronic watch according to the first modification example of the second embodiment and illustrating a state in which the antenna protrudes out.

FIG. 6 is an enlarged sectional view illustrating a wristwatch-type electronic watch according to a first modification example of the second embodiment and illustrating a state in which an antenna is accommodated. FIG. 7 is an enlarged sectional view illustrating the wristwatch-type electronic watch according to the first modification example of the second embodiment and illustrating a state in which the antenna protrudes out.

As illustrated in FIG. 6, a locking mechanism 40B according to the first modification example of the second embodiment includes an engagement pin 46 provided in the external body 31 and a recessed engagement portion 47 formed in the internal body 32.

The engagement pin 46 is inserted into a through-hole 31h formed in the external body 31. The engagement pin 46 is provided to be movable in the radial direction of the external body 31 along the through-hole 31h. Increased diameter portions 46a and 46b having an outer diameter greater than an inner diameter of the through-hole 31h are formed at both end portions of the engagement pin 46. The increased diameter portions 46a and 46b regulates the excessive movement of the engagement pin 46 in the radial direction of the external body 31.

The recessed engagement portion 47 is formed on the outer circumferential surface 32g of the internal body 32. A groove portion 48, which is continuous to the recessed engagement portion 47, extends toward the end portion 32b of the internal body 32, and is shallower than the recessed engagement portion 47, is formed in the outer circumferential surface 32g of the internal body 32.

In the wristwatch-type electronic watch 10B, during the normal use of being worn around a wrist of a user, the internal body 32 is pressed into the display unit 12 side with respect to the external body 31.

In this state, in the locking mechanism 40B, the increased diameter portion 46b of the engagement pin 46 is inserted in and engages with the recessed engagement portion 47. In this manner, the internal body 32 and the external body 31 are retrained not to be slidable.

As illustrated in FIG. 7, when the wristwatch-type electronic watch 10B is charged from the charger 100, the engagement pin 46 is pulled outward from the external body 31. Then, the increased diameter portion 46b and the recessed engagement portion 47 are disengaged and it is possible for the internal body 32 and the external body 31 to be slide. Also, the internal body 32 is caused to slide and is stretched toward the side opposite to the display unit 12 with respect to the external body 31. The increased diameter portion 46b of the engagement pin 46 enters the groove portion 48 formed in the outer circumferential surface 32g of the internal body 32.

Thus, for the user, it is possible to charge the wristwatch-type electronic watch 10B in a state in which the end portion 32a of the internal body 32 comes into direct contact with the flat cover plate 101 of the charger 100. Accordingly, it is possible to realize the watch main body 11 and the wristwatch-type electronic watch 10B in which it is possible to secure high charging efficiency, without impairing the visibility of the display unit 12.

Second Modification Example of Second Embodiment

Figure 8:
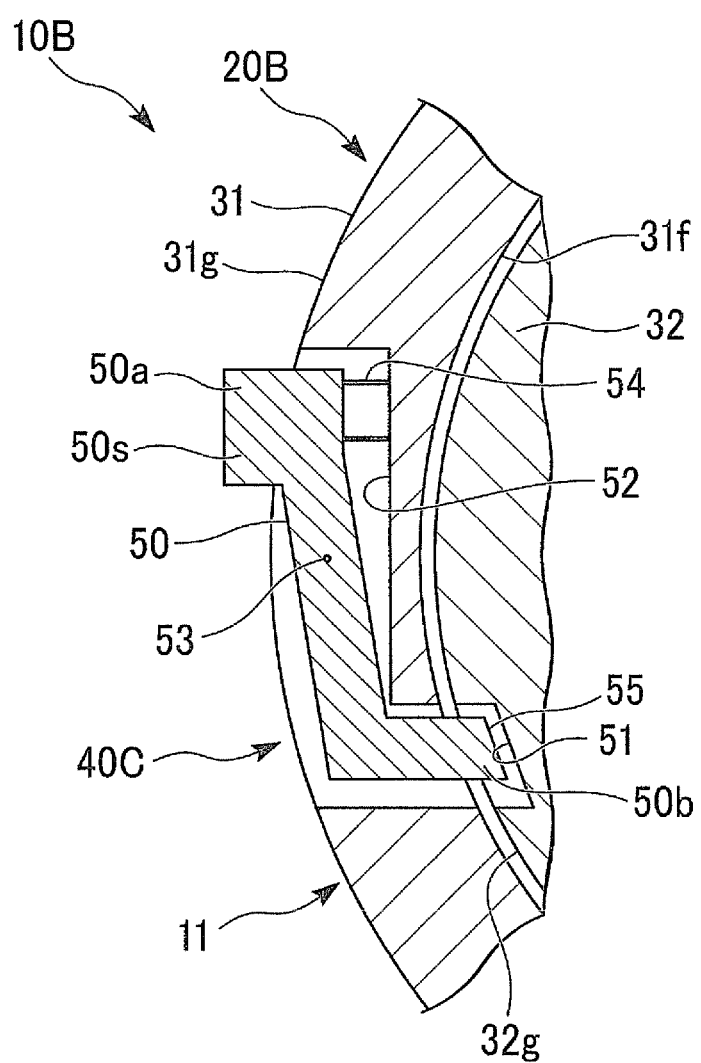
FIG. 8 is an enlarged sectional view illustrating the wristwatch-type electronic watch according to a second modification example of the second embodiment and illustrating a state in which the antenna is accommodated.

FIG. 8 is an enlarged sectional view illustrating a wristwatch-type electronic watch according to a second modification example of the second embodiment and illustrating a state in which an antenna is accommodated.

Figure 9:
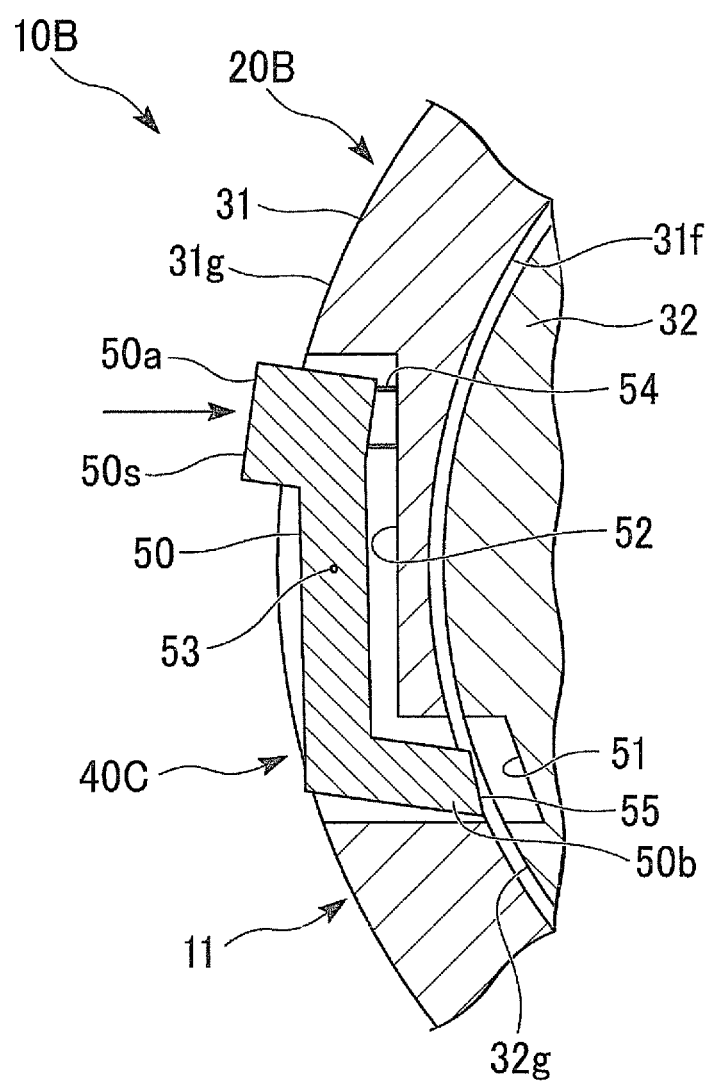
FIG. 9 is an enlarged sectional view illustrating the wristwatch-type electronic watch according to the second modification example of the second embodiment and illustrating a state in which the antenna protrudes out.

FIG. 9 is an enlarged sectional view illustrating the wristwatch-type electronic watch according to the second modification example of the second embodiment and illustrating a state in which the antenna protrudes out.

As illustrated in FIG. 8, a locking mechanism 40C according to the second modification example of the second embodiment includes an engagement arm 50 provided in the external body 31 and a recessed engagement portion 51 formed in the internal body 32.

The engagement arm 50 is provided in a recessed mounting section 52 formed on the outer circumferential surface 31g of the external body 31. In the engagement arm 50, an intermediate portion of the engagement arm 50 in the longitudinal direction is supported to be rotatable by a pin 53.

At one end 50a of the engagement arm 50, a protruding section 50s which protrudes outward from the outer circumferential surface 31g of the external body 31. An engagement claw portion 55, which penetrates the external body 31 and protrudes inward from the external body 31, is provided integrally to the other end 50b of the engagement arm 50. In addition, a spring 54, which biases the one end 50a of the engagement arm 50 outward from the external body 31, is provided between the one end 50a of the engagement arm 50 and the recessed mounting section 52. In the engagement arm 50 supported to be rotatable by the pin 53, an engagement claw portion 55 on the other end 50b side is biased inward from the external body 31.

A recessed engagement portion 51 is formed in the outer circumferential surface 32g of the internal body 32, and the engagement claw portion 55 of the engagement arm 50 is inserted in and engages with the recessed engagement portion.

In the wristwatch-type electronic watch 10B, during the normal use such as being worn on the wrist of the user, similar to the second embodiment illustrated in FIG. 5, the internal body 32 is pressed into the display unit 12 side with respect to the external body 31.

In this state, in the locking mechanism 40C, the engagement claw portion 55 of the engagement arm 50 protrudes inward from the external body 31 and the engagement claw portion 55 of the engagement arm 50 is inserted and engaged. In this manner, the internal body 32 and the external body 31 are restrained not to slide.

As illustrated in FIG. 9, when the wristwatch-type electronic watch 10B is charged from the charger 100, the protruding section 50s of the engagement arm 50 is pushed to the outer side of the external body 31. The engagement arm 50 rotates around the pin 53, the engagement claw portion 55 is pulled out from the recessed engagement portion 51 and the engagement between the engagement arm 50 and the recessed engagement portion 51 is released. Thus, the internal body 32 and the external body 31 can slide to each other. Also, similar to the second embodiment illustrated in FIG. 6, the internal body 32 is caused to slide toward the side opposite to the display unit 12 and to be released with respect to the external body 31. Thus, for the user, it is possible to charge the wristwatch-type electronic watch 10B in a state in which the end portion 32a of the internal body 32 comes into direct contact with the flat cover plate 101 of the charger 100.

Third Embodiment

Next, the antenna unit and the portable electronic apparatus according to a third embodiment will be described.

Figure 10:
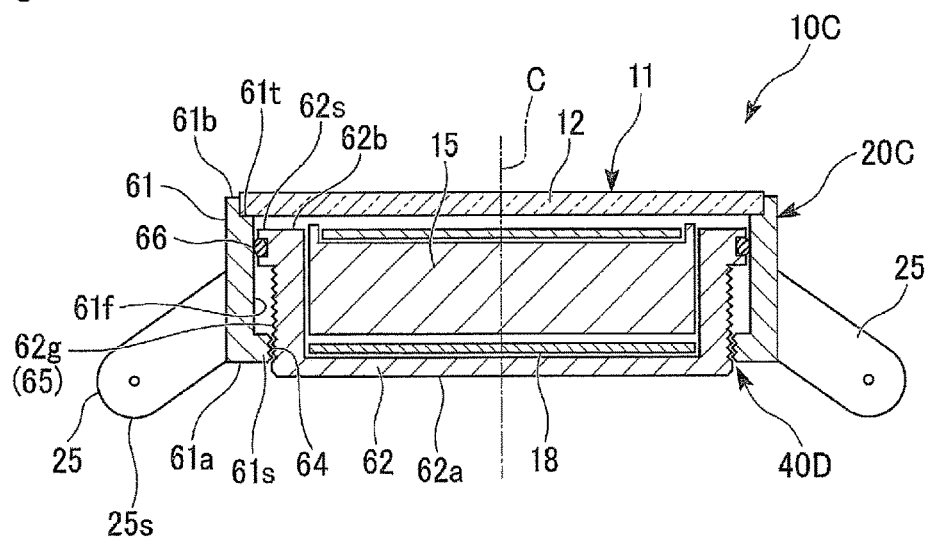
FIG. 10 is an enlarged sectional view illustrating a wristwatch-type electronic watch according to a third embodiment and illustrating a state in which an antenna is accommodated.
Figure 11:
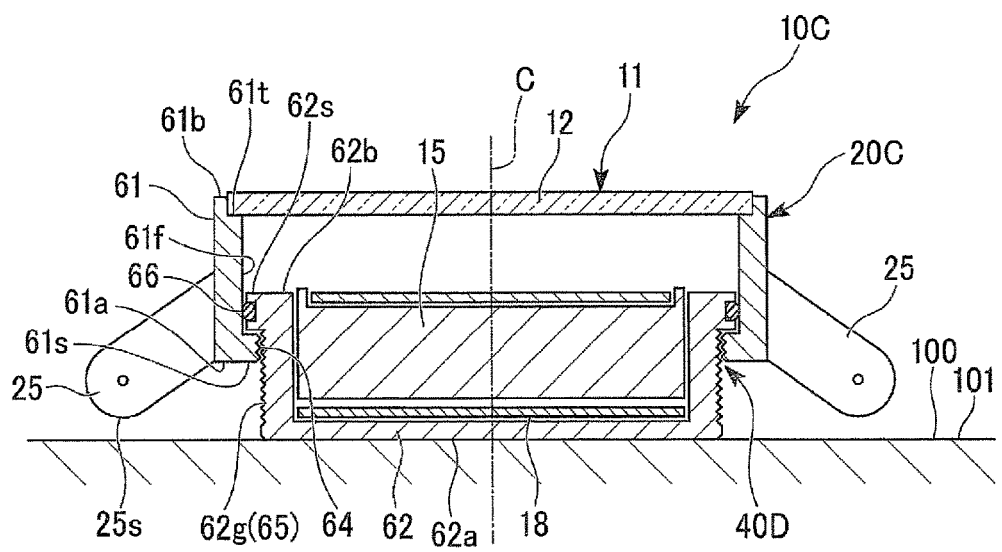
FIG. 11 is an enlarged sectional view illustrating the wristwatch-type electronic watch according to the third embodiment and illustrating a state in which the antenna protrudes out.

FIG. 10 is an enlarged sectional view illustrating a wristwatch-type electronic watch according to a third embodiment and illustrating a state in which an antenna is accommodated. FIG. 11 is an enlarged sectional view illustrating the wristwatch-type electronic watch according to the third embodiment and illustrating a state in which the antenna protrudes out.

In the first embodiment and the second embodiment, the internal body 22 or 32 is configured to slide with respect to external body 21 or 31 (refer to FIG. 2 and FIG. 4). In comparison, the third embodiment is different from the first embodiment and the second embodiment in that, as illustrated in FIG. 10, an internal body 62 is screwed to an external body 61. Further, in the third embodiment to be described below, the same reference signs are assigned to a configuration common with the first embodiment and the second embodiment, and thus detailed description thereof is omitted.

As illustrated in FIG. 10, the watch main body 11 (corresponding to an "antenna unit" in an aspect) of a wristwatch-type electronic watch 10C (corresponding to a "portable electronic apparatus" in an aspect) includes a case 20C, the display unit 12, the movement 15 accommodated in the case 20C, and the antenna 18.

The case 20C has the external body 61 (corresponding to a "case main body" in an aspect) and the internal body 62 (corresponding to an "antenna accommodating unit" in an aspect) provided in the external body 61.

The external body 61 has a cylindrical shape with both ends opened.

A protruding ridge portion 61s, which is continuous in the circumferential direction and protrudes inward, is formed in an inner circumferential surface 61f of the external body 61 on one end side 61a in a direction along the central axis C of the external body 61. The internal threaded section 64 is formed in the inner circumferential surface of the protruding ridge portion 61s.

In addition, a step portion 61t, which is increased in diameter on the outer circumferential side with respect to the inner circumferential surface 61f, on the other end side 61b in the direction along the central axis, in the inner circumferential surface 61f of the external body 61. The display unit 12 is fitted to the step portion 61t.

The internal body 62 has an end portion 62b on the other end side 61b of the external body 61, which is opened, and has a bottomed cylindrical shape having an end portion 62a on the opposite side, which is closed.

The external threaded section 65 which meshes with the internal threaded section 64 is formed in an outer circumferential surface 62g of the internal body 62. Thus, the internal body 62 is caused to rotate relatively around the central axis C with respect to the external body 61, and thereby the internal body 62 can move with respect to the external body 61 in a direction along the central axis C. In addition, the internal threaded section 64 and external threaded section 65 are tightly fastened and screwed, and thereby a locking mechanism 40D is configured. By the locking mechanism 40D, the internal body 62 and the external body 61 are restrained not to slide.

In the end portion 62b of the internal body 62, an outer circumferential flange 62s which stretches out on the outer circumferential side is formed. The outer circumferential flange 62s butts the protruding ridge portion 61s of the external body 61 when the internal body 62 is caused to move toward the side opposite to the display unit 12, thereby regulating a movement amount of the internal body 62.

In addition, an annular sealing member 66 is provided on the outer circumferential surface of the outer circumferential flange 62s. The internal body 62 slides and comes into contact with the inner circumferential surface 61f of the external body 61. Thus, waterproof properties are secured between the internal body 62 and the external body 61.

The movement 15 is accommodated on the inner side of the internal body 62.

The antenna 18 is provided between the end portion 62a of the internal body 62 on the closed end side and the movement 15 on the inner side of the internal body 62. Thus, in the watch main body 11, the antenna 18 and the display unit 12 are disposed to face each other with the movement 15 interposed therebetween.

In the wristwatch-type electronic watch 10C, during the normal use such as being worn on the wrist of the user, the internal body 62 is pressed to the display unit 12 side with respect to the external body 61.

As illustrated in FIG. 11, when the wristwatch-type electronic watch 10C is charged from the charger 100, the internal body 62 is caused to rotate around the central axis C with respect to the external body 61. Then, the internal body 62 moves in the direction along the central axis C with respect to the external body 61. Thus, the internal body 62 is pulled out toward the side opposite to the display unit 12 with respect to the external body 61. For the user, it is possible to set and charge the wristwatch-type electronic watch 10C in a state in which the end portion 62a of the internal body 62 comes into direct contact with the flat cover plate 101 of the charger 100.

Similar to the first embodiment, in the antenna unit and the portable electronic apparatus according to the third embodiment, it is possible to cause the internal body 62 to move toward the side opposite to the display unit 12 when the antenna 18 is used for the charging. It is possible for the antenna 18 to be caused to approach the coil of the charger 100 without causing the display unit 12 to face the charger 100 side. Accordingly, it is possible to prevent visibility of the display unit 12 from being impaired and it is possible to secure high charging efficiency.

In addition, the internal body 62 has an external threaded section 65 on the outer circumferential surface and is screwed to the internal threaded section 64 formed in the external body 61. In this configuration, the internal body 62 itself is caused to rotate with respect to the external body 61, and thereby it is possible to cause the internal body 62 to move. Accordingly, it is possible to easily perform a positional change of the antenna 18. In addition, the internal threaded section 64 and the external threaded section 65 are tightly fastened and screwed, and thereby it is possible to simply configure the locking mechanism 40D which arbitrarily adjusts relative positions of the internal body 62 and the external body 61.

Fourth Embodiment

Next, an antenna unit and a portable electronic apparatus according to a fourth embodiment will be described.

Figure 12:
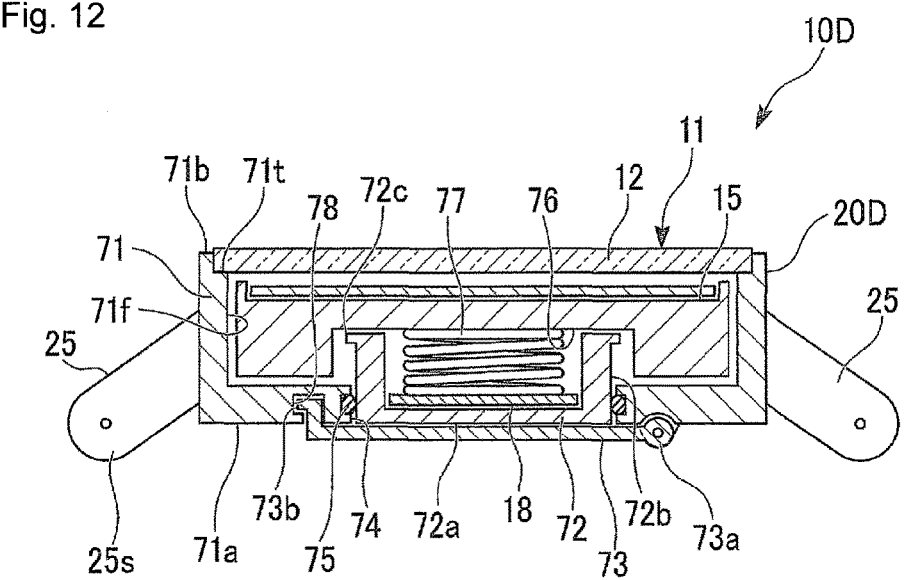
FIG. 12 is an enlarged sectional view illustrating a wristwatch-type electronic watch according to a fourth embodiment and illustrating a state in which an antenna is accommodated.

FIG. 12 is an enlarged sectional view illustrating the wristwatch-type electronic watch according to the fourth embodiment and illustrating a state in which the antenna is accommodated.

Figure 13:
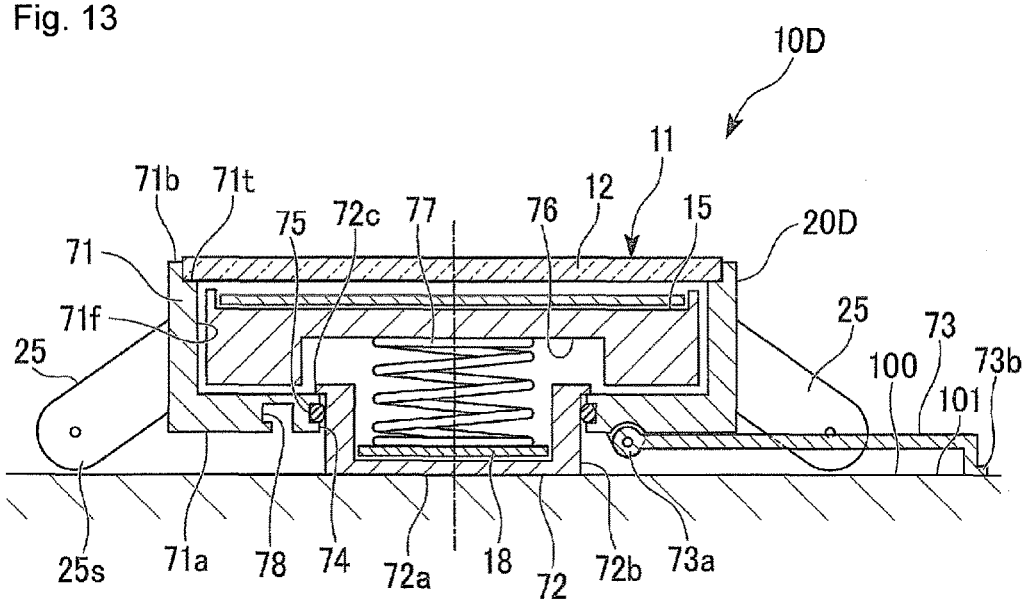
FIG. 13 is an enlarged sectional view illustrating the wristwatch-type electronic watch according to the fourth embodiment and illustrating a state in which the antenna protrudes out.

FIG. 13 is an enlarged sectional view illustrating the wristwatch-type electronic watch according to the fourth embodiment and illustrating a state in which the antenna protrudes out.

The respective embodiments described above have configurations in which the internal body 22, 32, or 62 relatively moves with respect to the external body 21, 31, or 61, (refer to FIG. 2 to FIG. 5 and FIG. 10 to FIG. 11). In comparison, the fourth embodiment is different from the respective embodiments described above in that, as illustrated in FIG. 12, a lid member 73 is provided. Further, in the fourth embodiment to be described below, the same reference signs are assigned to a configuration common to the respective embodiments described above, and thus detailed description thereof is omitted.

As illustrated in FIG. 12, the watch main body 11 (corresponding to an "antenna unit" in an aspect) of a wristwatch-type electronic watch 10D (corresponding to a "portable electronic apparatus" in an aspect) includes a case 20D, the display unit 12, the movement 15 accommodated in the case 20D, and the antenna 18.

The case 20D has a case main body 71, an antenna case 72 (corresponding to an "antenna accommodating unit" in an aspect), and a lid member 73 (corresponding to a "holding member" in an aspect).

The case main body 71 has a bottomed cylindrical shape with one end 71a side closed and the other end 71b side opened.

An opening 74 is formed at the center portion on the one end 71a of the case main body 71. An annular sealing member 75 is provided in the inner circumferential edge of the opening 74.

In addition, a step portion 71t, which is increased in diameter on the outer circumferential side with respect to the inner circumferential surface 71f, on the other end 71b side, is formed in the inner circumferential surface 71f of the case main body 71. The display unit 12 is fitted to the step portion 71t.

The antenna case 72 is provided in the opening 74. The antenna case 72 includes, all in an integral manner, a bottom plate section 72a which closes the opening 74, a cylindrical section 72b which extends from the outer circumferential section of the bottom plate section 72a toward the display unit 12 side, and an outer circumferential flange 72c which stretches out from the end portion of the cylindrical section 72B on the display unit 12 side to the outer circumferential side.

The antenna case 72 can relatively move along the central axis C with respect to the case main body 71 in the opening 74. The cylindrical section 72b of the antenna case 72 slides and comes into contact with the sealing member 75. Thus, waterproof properties are secured between the antenna case 72 and the case main body 71.

When the antenna case 72 is caused to slide toward the side opposite to the display unit 12, the outer circumferential flange 72c butts the case main body 71 on the outer circumferential side of the opening 74, and thereby a movement amount of the antenna case 72 is regulated.

The antenna 18 is provided along the bottom plate section 72a in the inner side of the cylindrical section 72b of the antenna case 72.

The movement 15 is accommodated in the case main body 71. In the watch main body 11, the antenna 18 and the display unit 12 are disposed to face each other with the movement 15 interposed therebetween.

A recessed accommodation section 76, which accommodates the antenna case 72, is formed on a side facing the antenna case 72 in the movement 15. A bias member 77 such as a coil spring, which biases the antenna case 72 toward the side opposite to the display unit 12, is provided between the recessed accommodation section 76 and the antenna 18 provided along the bottom plate section 72a of the antenna case 72.

A lid member 73 can open and close the opening 74. The lid member 73 is rotatably linked to the one end 71a of the case main body 71 through a hinge 73a. The lid member 73 has a latch 73b on the side opposite to the hinge 73a. The latch 73b can engage with and be disengaged from an engagement target section 78 formed in the one end 71a of the case main body 71.

When the lid member 73 closes the opening 74, the lid member covers the antenna case 72 and restrains the antenna case 72 from protruding from the case main body 71. When the lid member 73 opens the opening 74, the antenna case 72 protrudes toward the side opposite to the display unit 12 from the case main body 71 due to the bias force of the bias member 77.

Further, an example, in which the lid member 73 is applied as an example of a holding member, is described; however, the lid member may restrain the antenna case 72 from protruding from the case main body 71 or, for example, a so-called sliding switch which can slide toward the opening 74 in the radial direction may be applied.

In an application example, during the restraint of the antenna case 72 described above, the sliding switch engages with the antenna case 72.

Also, when the sliding switch is caused to slide in a direction in which the sliding switch is farther away from the center of the opening 74 and the engagement state with the antenna case 72 is released, the antenna case 72 protrudes toward the side opposite to the display unit 12 from the case main body 71 due to the bias force of the bias member 77.

In the wristwatch-type electronic watch 10D, during the normal use of being worn on the wrist of the user, the antenna case 72 is pressed into the case main body 71.

In addition, as illustrated in FIG. 13, when the user charges the wristwatch-type electronic watch 10D from the charger 100, the lid member 73 is opened. Then, the antenna case 72 protrudes from the case main body 71 due to the bias force of the bias member 77. For the user, it is possible to set and charge the wristwatch-type electronic watch 10D in a state in which the bottom plate section 72a of the antenna case 72 comes into direct contact with the flat cover plate 101 of the charger 100.

According to the fourth embodiment, during the normal use, the antenna case 72 is covered with the lid member 73 when the antenna case 72 is positioned on the display unit 12 side, and thereby it is possible to improve the external appearance. In addition, during the charging, since the bias member 77 causes the antenna case 72 to leap out toward the side opposite to the display unit 12 when the lid member 73 is released, it is possible for the antenna case 72 to easily move.

Further, the present invention is not limited to the embodiments described with reference to the drawings and various modification examples within the technological range are considered.

In the respective embodiments, the wristwatch-type electronic watches 10A to 10D are described as examples; however, as long as an antenna for charging is provided, the example is not limited to the wristwatch-type electronic watches 10A to 10D. For example, the present invention can also be applied to other portable electronic apparatuses such as a heart rate meter or a body composition meter.

Further, the application is not limited to the wireless charging due to the electromagnetic induction, but the present invention can also be applied to a portable electronic apparatus which includes an antenna for performing near field communication.

In addition, it is possible to appropriately replace a component in the embodiments described above with a known component within a range without departing from the gist of the present invention.

What is claimed is:

1. An antenna unit comprising:
a case main body;
a display unit which is provided on one side of the case main body and displays information;
an antenna which is provided on the other side of the case main body and is disposed to face the display unit at an interval therebetween;
an antenna accommodating unit which accommodates the antenna and is movable with respect to the case main body toward a side opposite to the display unit; and
a locking mechanism that arbitrarily adjusts relative positions of the antenna accommodating unit and the case main body when the antenna accommodating unit is positioned on a side of the display unit.

2. The antenna unit according to claim 1,
wherein the case main body has a protruding section which protrudes toward the side opposite to the display unit,
wherein the antenna accommodating unit protrudes from the case main body by moving toward the side opposite to the display unit, and
wherein the antenna accommodating unit protrudes farther from the case main body than the protruding section from the case main body.

3. The antenna unit according to claim 1, further comprising:
a bias member that biases the antenna accommodating unit toward the side opposite to the display unit; and
a holding member that holds the antenna accommodating unit when the antenna accommodating unit is positioned on the side of the display unit.

4. The antenna unit according to claim 3,
wherein the holding member is a lid member that covers the antenna accommodating unit.

5. The antenna unit according to claim 1,
wherein the locking mechanism is configured to have
an external threaded section formed on one side of the antenna accommodating unit and the case main body, and
an internal threaded section formed on the other side of the antenna accommodating unit and the case main body.

6. A portable electronic apparatus comprising:
the antenna unit according to claim 1.

* * * * *